United States Patent [19]
Benner

[11] Patent Number: 5,820,190
[45] Date of Patent: Oct. 13, 1998

[54] TRACK BED EXTENDING SYSTEM

[76] Inventor: William W. Benner, 516 Buttonwood St., Perkasie, Pa. 18944

[21] Appl. No.: 804,072

[22] Filed: Feb. 21, 1997

[51] Int. Cl.[6] .................................................. B62C 1/06
[52] U.S. Cl. ............................................ 296/26.09
[58] Field of Search .................. 414/522, 537, 414/538; 296/26; 211/151

[56] References Cited

U.S. PATENT DOCUMENTS

| | | | |
|---|---|---|---|
| 3,726,422 | 4/1973 | Zelin | 296/26 |
| 4,685,857 | 8/1987 | Goeser et al. | 296/26 |
| 4,993,088 | 2/1991 | Chudik | 296/26 |
| 5,513,941 | 5/1996 | Kulas et al. | 296/26 |

*Primary Examiner*—Stephen Avila

[57] ABSTRACT

A new Track Bed Extending System for providing a slide-out work table from the rear portion of a pickup truck or van which allows easy access to tools and supplies during a work project. The inventive device includes a first and second track secured to a bed of a pickup, an enlongated table slidably engaging the tracks by a plurality of closed bearings, and a first and second leg pivotally secured to the table for support end opposite of the bed. A side table is also pivotally attached to the elongated table, and a second and third leg are pivotally attached to the side table to support an end opposite of the elongated table during operation.

8 Claims, 3 Drawing Sheets

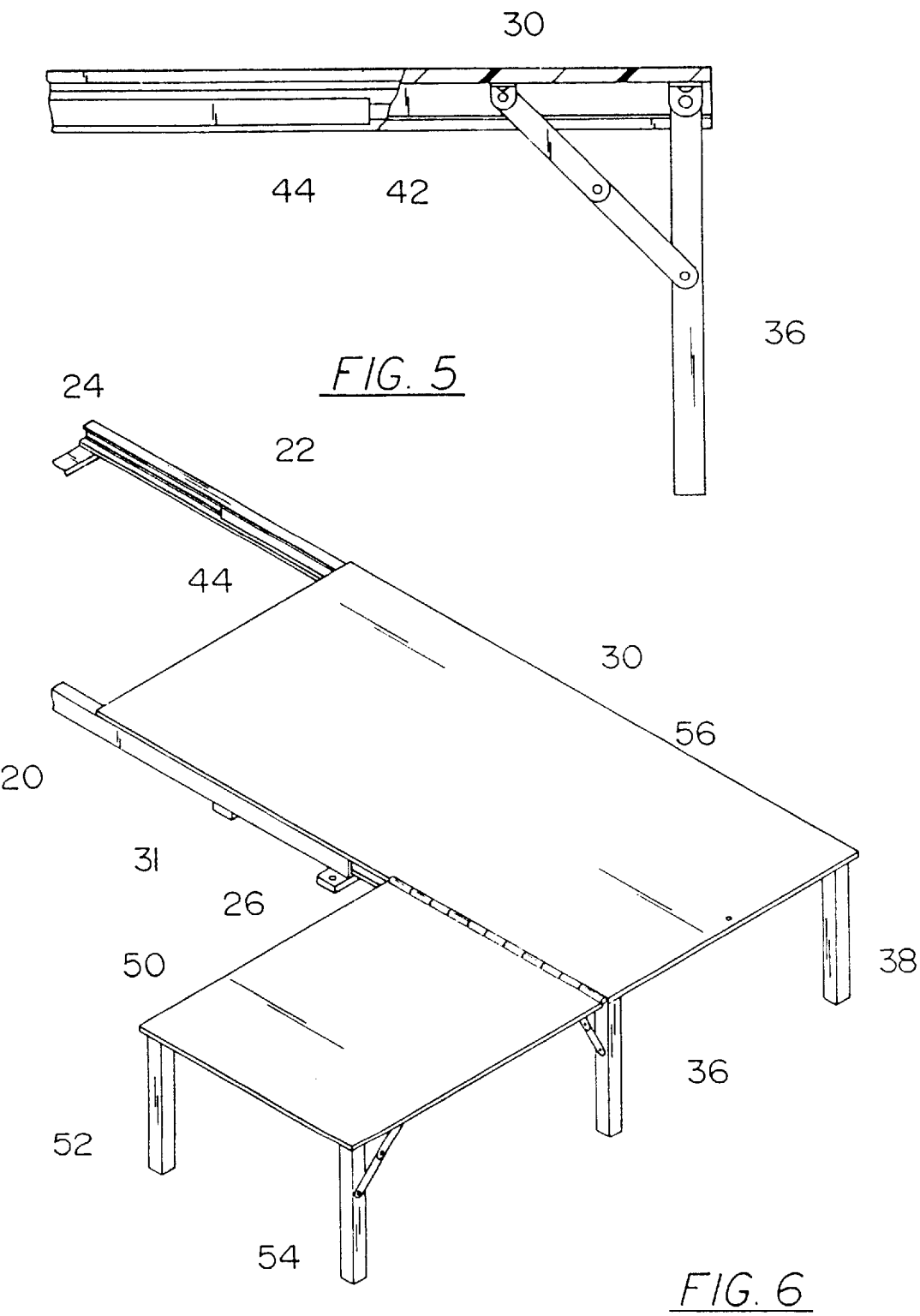

TRACK BED EXTENDING SYSTEM

BACKGROUND OF THE INVENTION

1. Field of the Invention

The present invention relates to Pickup Truck Bed Devices and more particularly pertains to a new Track Bed Extending System for providing a slide-out work table from the rear portion of a pickup truck or van which allows easy access to tools and supplies during a work project.

2. Description of the Prior Art

The use of Pickup Truck Bed Devices is known in the prior art. More specifically, Pickup Truck Bed Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Pickup Truck Bed Devices include U.S. Pat. No. 4,856,840; U.S. Pat. No. 5,169,202; U.S. Pat. No. 5,267,748; U.S. Pat. 5,328,225; U.S. Pat. 4,252,492 and U.S. Design Pat. No. 267,709.

While these devices fulfill their respective, particular objectives and requirements, the aforementioned patents do not disclose a new Track Bed Extending System. The inventive device includes a first and second track secured to a bed of a pickup, an elongated table slidably engaging the tracks by a plurality of closed bearings, and a first and second leg pivotally secured to the table for support end opposite of the bed.

In these respects, the Track Bed Extending System according to the present invention substantially departs from the conventional concepts and designs of the prior art, and in so doing provides an apparatus primarily developed for the purpose of providing a slide-out work table from the rear portion of a pickup truck or van which allows easy access to tools and supplies during a work project.

SUMMARY OF THE INVENTION

In view of the foregoing disadvantages inherent in the known types of Pickup Truck Bed Devices now present in the prior art, the present invention provides a new Track Bed Extending System construction wherein the same can be utilized for providing a slide-out work table from the rear portion of a pickup truck or van which allows easy access to tools and supplies during a work project.

The general purpose of the present invention, which will be described subsequently in greater detail, is to provide a new Track Bed Extending System apparatus and method which has many of the advantages of the Pickup Truck Bed Devices mentioned heretofore and many novel features that result in a new Track Bed Extending System which is not anticipated, rendered obvious, suggested, or even implied by any of the prior art Pickup Truck Bed Devices, either alone or in any combination thereof.

To attain this, the present invention generally comprises a first and second track secured to a bed of a pickup, an elongated table slidably engaging the tracks by a plurality of closed bearings, and a first and second leg pivotally secured to the table for support end opposite of the bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Track Bed Extending System apparatus and method which has many of the advantages of the Pickup Truck Bed Devices mentioned heretofore and many novel features that result in a new Track Bed Extending System which is not anticipated, rendered obvious, suggested, or even implied by any of the prior art Pickup Truck Bed Devices, either alone or in any combination thereof.

It is another object of the present invention to provide a new Track Bed Extending System which may be easily and efficiently manufactured and marketed.

It is a further object of the present invention to provide a new Track Bed Extending System which is of a durable and reliable construction.

An even further object of the present invention is to provide a new Track Bed Extending System which is susceptible of a low cost of manufacture with regard to both materials and labor, and which accordingly is then susceptible of low prices of sale to the consuming public, thereby making such Track Bed Extending System economically available to the buying public.

Still yet another object of the present invention is to provide a new Track Bed Extending System which provides in the apparatuses and methods of the prior art some of the advantages thereof, while simultaneously overcoming some of the disadvantages normally associated therewith.

Still another object of the present invention is to provide a new Track Bed Extending System for providing a slide-out work table from the rear portion of a pickup truck or van which allows easy access to tools and supplies during a work project.

Yet another object of the present invention is to provide a new Track Bed Extending System which includes a first and second track secured to a bed of a pickup, an elongated table slidably engaging the tracks by a plurality of closed bearings, and a first and second leg pivotally secured to the table for support end opposite of the bed.

Still yet another object of the present invention is to provide a new Track Bed Extending System that makes tools and equipment more readily accessible by allowing them to be pulled out from within a bed of a pickup truck or van.

Even still another object of the present invention is to provide a new Track Bed Extending System that utilizes a closed bearing track system for reducing the chances of accumulation of debris.

Even still another object of the present invention is to add a second table for increasing a user's work space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side cut away view of the present invention extended from within the bed of the pickup truck.

FIG. 6 is an upper side perspective view of the present invention.

DESCRIPTION OF THE PREFERRED EMBODIMENT

Figure 1:
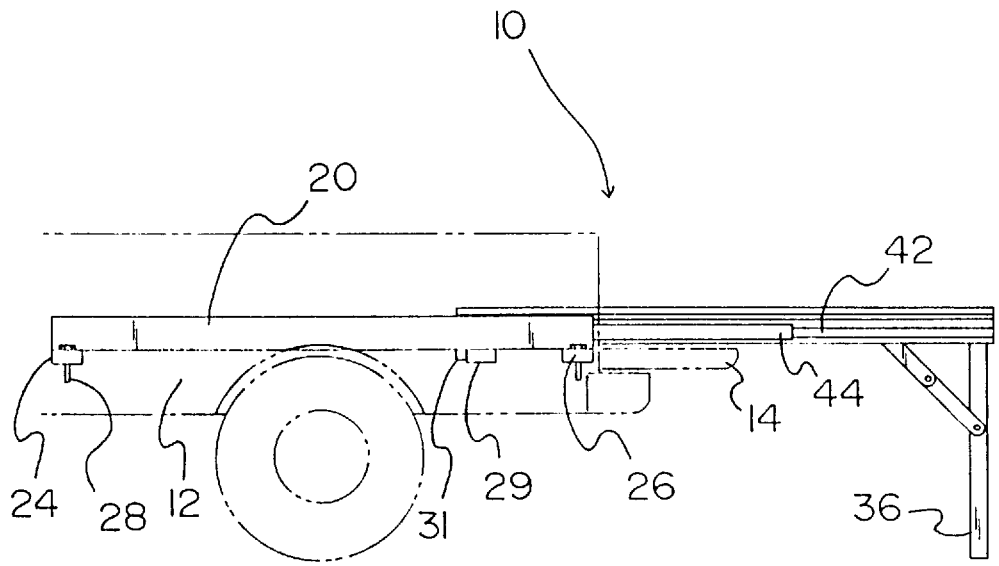
FIG. 1 is an side view of a new Track Bed Extending System according to the present invention.

With reference now to the drawings, and in particular to FIGS. 1 through 6 thereof, a new Track Bed Extending System embodying the principles and concepts of the present invention and generally designated by the reference numeral 10 will be described.

More specifically, it will be noted that the Track Bed Extending System 10 comprises a first track 20 and a second track 22 aligned parallel to one another, a first cross member 24 secured mesial the first track 20 and the second track 22 at an end, a second cross member 26 secured mesial the first track 20 and the second track 22 opposite of the first cross member 24, an elongated table 30 having a bottom surface formed to fit within the bed 12, a first leg 36 and a second leg 38 pivotally secured to the bottom surface, for supporting the elongated table 30, and a closed bearing means 40 slidably attaching the elongated table 30 to the first track 20 and the second track 22. The elongated table 30 preferably is constructed from a rigid plastic such as ABS or high-density polyethylene (HDPE). The closed bearing means 40 is for allowing extension of the elongated table 30 from within the bed 12 past a tailgate 14 pivotally secured to the bed 12. The first cross member 24 and the second cross member 26 are for securing to a bed 12 of a pickup truck or van as shown in FIG. 1 of the drawings.

Figure 2:
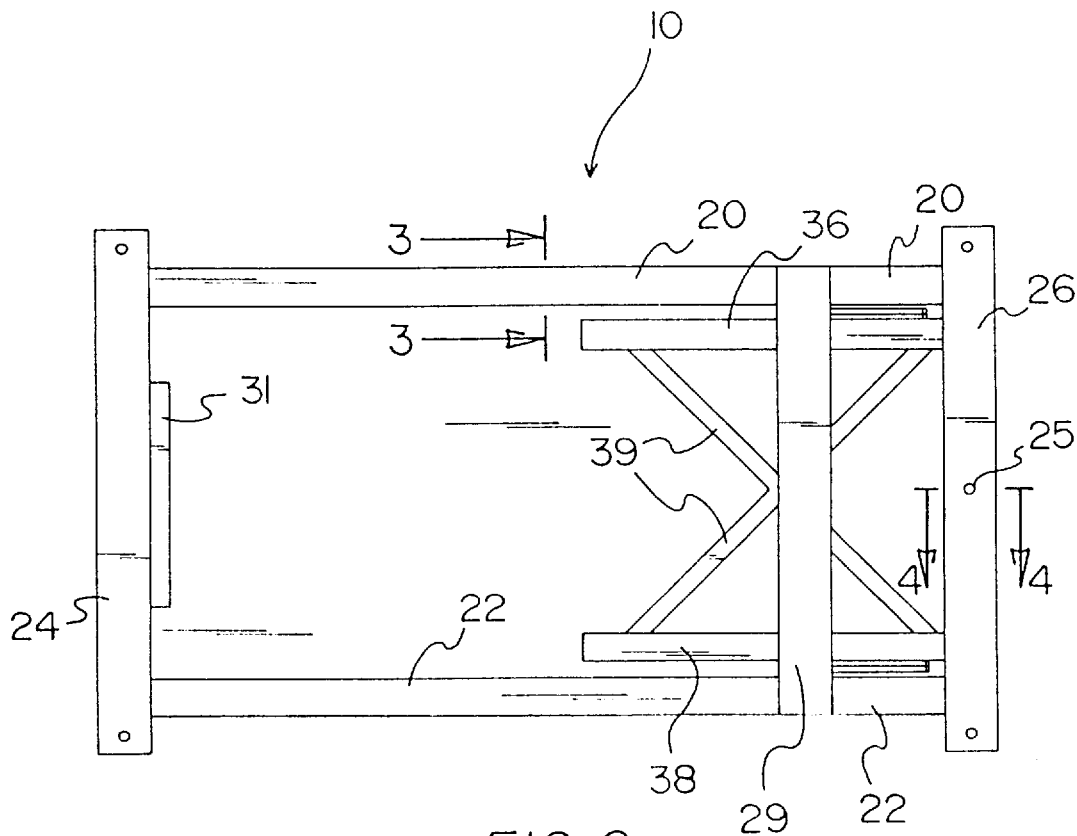
FIG. 2 is a bottom view of the present invention.
Figure 3:
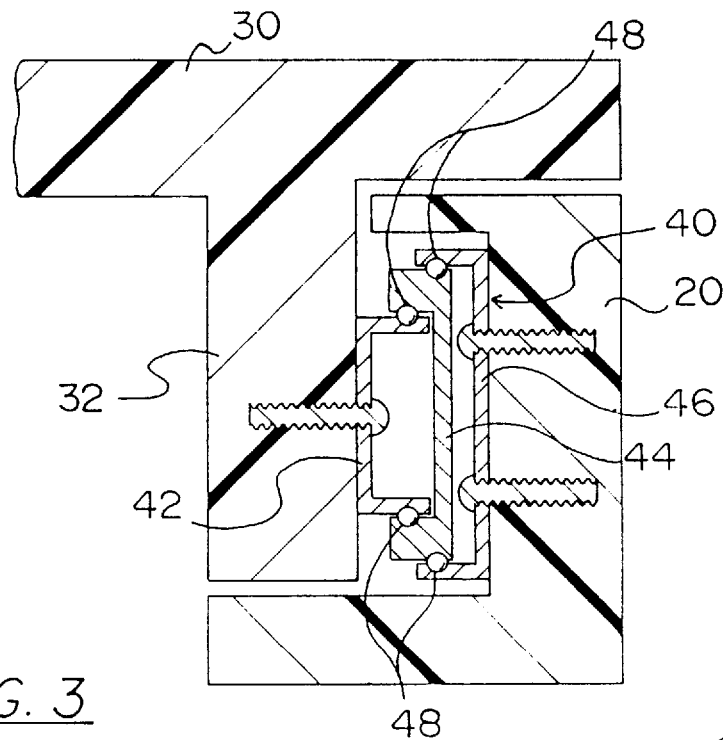
FIG. 3 is a cross sectional view taken along line 3—3 of FIG. 2 disclosing the closed bearing means.

As best shown in FIG. 3 of the drawings, the closed bearing means 40 comprises a first member 32 and a second member 34 secured to the bottom surface of the elongated table 30 parallel to a longitudinal axis of the elongated table 30 adjacent to respective the first track 20 and the second track 22. A pair of inner elongated members 42 is secured to the first member 32 and the second member 34. A pair of mesial elongated members 44 are slidably secured around the inner elongated members 42 by a plurality of ball bearings 48. A pair of outer elongated members 46 are secured to the first track 20 and the second track 22. The outer elongated members 46 are slidably secured around the mesial elongated members 44 by a plurality of ball bearings 48. As shown in FIG. 2 of the drawings, a pair of cross supports 39 are secured mesial the first leg 36 and the second leg 38 for adding support to the first leg 36 and the second leg 38.

Figure 4:
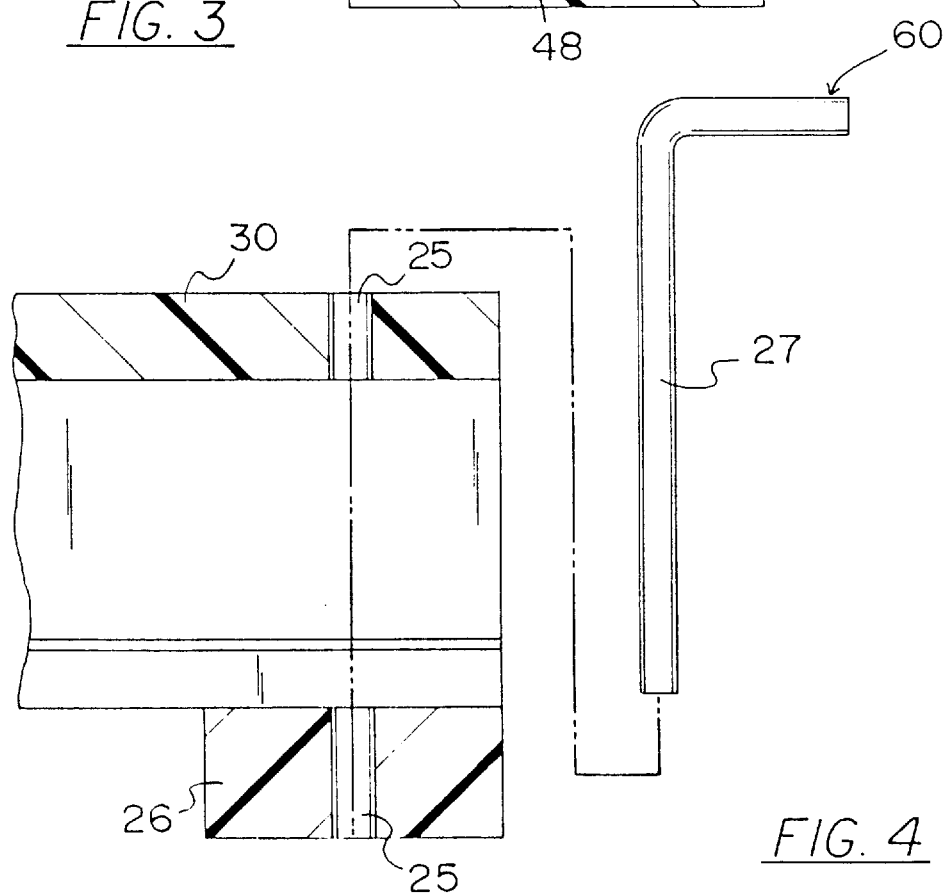
FIG. 4 is a cross sectional view taken along line 4—4 of FIG. 2 disclosing the locking pin and the locking aperture.

As shown in FIGS. 2, 3 and 6 of the drawings, a locking means 60 selectively retains the elongated table 30 within the bed 12. The locking means comprises a locking aperture 25 extended through the elongated table 30 and thereafter through the second cross member 26. A locking pin 27 removably projects through the locking aperture 25 for preventing the elongated table 30 from extending from within the bed 12 as best shown in FIG. 4 of the drawings. A stop cross member 29 is secured mesial the first track 20 and the second track 22 near the second cross member 26 as best shown in FIG. 2 of the drawings. A stop member 31 is secured to the bottom surface of the elongated table 30 for engaging the stop cross member 29 when the elongated table 30 is extended to prevent over extension.

In an alternative embodiment as shown in FIG. 6 of the drawings, a side table 50 is pivotally attached to the elongated table 30 by a hinge 56. A third leg 52 is pivotally attached to the side table 50 and a fourth leg 54 is pivotally attached to the side table 50. The third and fourth legs 52, 54 support the end of the side table 50 opposite of the hinge 56 during use.

In use, a user positions tools and equipment onto the elongated table 30 for transporting to a remote work site. At the remote work site, the user removes the locking pin 27 from within the locking aperture 25. The elongated table 30 is pulled outward from within the bed 12 of the pickup truck or van. The user manipulates the first and second legs 36, 38 for supporting the end of the elongated table 30 opposite of the bed 12 when fully extended. The stop member 31 prevents the elongated table 30 from extending to far by engaging the stop cross member 29. The user is thereafter able to easily reach the tools and equipment for completing the work project. The user is also able to utilize the elongated table 30 as a work surface for cutting, drilling or other mechanical work. When finished, the user simply folds the first and second legs 36, 38 and pushes the elongated table 30 back into the bed 12. The locking pin 27 is inserted into the locking aperture 25 to prevent accidental extension of the elongated table 30 during transportation. The same above stated procedure is done for the alternative embodiment comprising the side table 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A track bed extending system comprising:
    a first track and a second track aligned parallel to one another;
    a first cross member secured between said first track and said second track at an end;
    a second cross member secured between said first track and said second track opposite of said first cross member, wherein said first cross member and said second cross member are for securing to a bed of a pickup truck or van;
    an elongated table having a bottom surface formed to fit within said bed;
    a first leg and a second leg pivotally secured to said bottom surface, for supporting said elongated table; and
    a closed bearing means slidably attaching said elongated table to said first track and said second track, for allowing extension of said elongated table from within said bed past a tailgate pivotally secured to said bed;
    a locking means selectively retains said elongated table within said bed;
    said locking means including a locking aperture extending through said elongated table and thereafter through said second cross member; and
    said locking means including a locking pin removably projecting through said locking aperture for preventing said elongated table from extending from within said bed.

2. The track bed extending system of claim 1, including:
    a stop cross member secured between said first track and said second track near said second cross member; and
    a stop member secured to said bottom surface for engaging said stop cross member when said elongated table is extended.

3. The track bed extending system of claim 2, including:
    a side table pivotally attached to said elongated table by a hinge;
    a third leg pivotally attached to said side table; and
    a fourth leg pivotally attached to said side table, for supporting said side table during use.

4. The track bed extending system of claim 3, wherein said closed bearing means comprises:
    a first member and a second member secured to said bottom surface parallel to a longitudinal axis of said elongated table adjacent to respective said first track and said second track;
    an inner elongated member secured to said first member and said second member;
    a mesial elongated member slidably secured around said inner elongated member by a plurality of ball bearings; and
    an outer elongated member secured to said first track and said second track, wherein said outer elongated member is slidably secured around said mesial elongated member by a plurality of ball bearings.

5. The track bed extending system of claim 4, including a pair of cross supports secured between said first leg and said second leg for adding support to said first leg and said second leg.

6. The track bed extending system of claim 1, including a pair of cross supports secured between said first leg and said second leg for adding support to said first leg and said second leg.

7. The track bed extending system of claim 1, wherein said closed bearing means comprises:
    a first member and a second member secured to said bottom surface parallel to a longitudinal axis of said elongated table adjacent to respective said first track and said second track;
    an inner elongated member secured to said first member and said second member;
    a mesial elongated member slidably secured around said inner elongated member by a plurality of ball bearings; and
    an outer elongated member secured to said first track and said second track, wherein said outer elongated member is slidably secured around said mesial elongated member by a plurality of ball bearings.

8. The track bed extending system of claim 1, including:
    a side table pivotally attached to said elongated table by a hinge;
    a third leg pivotally attached to said side table; and
    a fourth leg pivotally attached to said side table, for supporting said side table during use.

* * * * *